May 29, 1951        R. F. GERVAIS        2,554,856
BLOWTORCH SHUTOFF HANGER
Filed Dec. 31, 1946
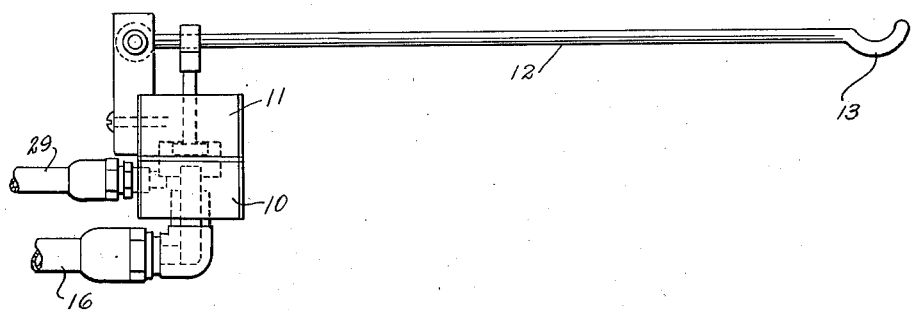
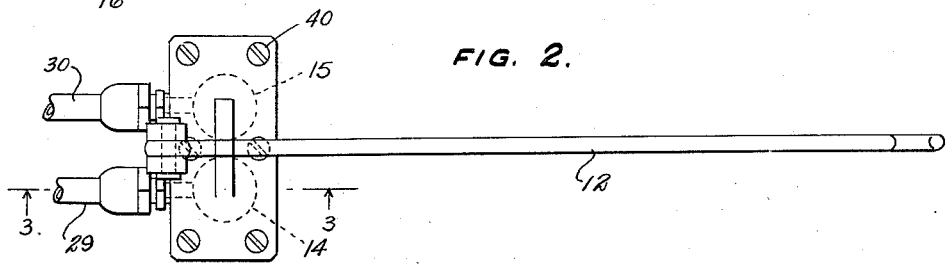
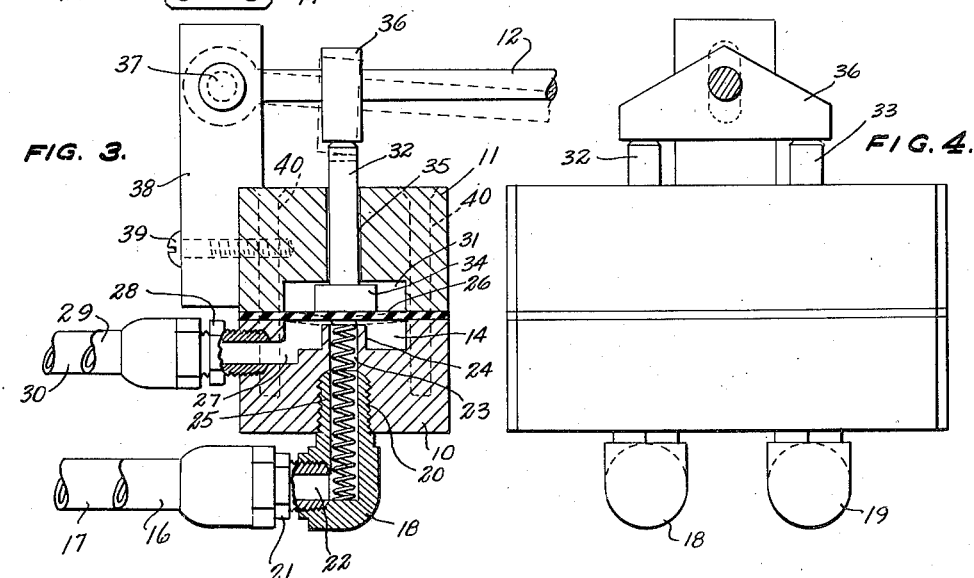
RAYMOND F. GERVAIS, Inventor Patented May 29, 1951

2,554,856

UNITED STATES PATENT OFFICE 2,554,856

BLOWTORCH SHUTOFF HANGER

Raymond F. Gervais, Los Angeles, Calif.

Application December 31, 1946, Serial No. 719,411

1 Claim. (Cl. 277—3)

This invention relates to hangers for blow torches and the like, of the type using combinations of oxygen and gas, and in particular, a hanger having a base through which the gas and oxygen supply tubes of the blow torch pass, wherein with valves associated with the tubes and adapted to be closed by an arm extending from the base, the valves will automatically be closed as a blow torch is placed upon the arm of the hanger.

Serious accidents have occurred, due to a welder placing a lighted blow torch aside while marking or adjusting parts to be welded, cut or burned, and because, before returning to the blow torch, the welder's attention is distracted, or he is called away from the work so that the blow torch, unintentionally, remains lighted.

With this thought in mind, the invention contemplates a hanger for blow torches and the like to the base of which the supply tubes of the blow torch are connected, and the elements are so arranged that, whenever the welder ceases to use the blow torch, it is returned to an arm of the hanger so that with valves in the supply connection in the base of the hanger, the supply connections may be automatically shut off when the blow torch is placed upon the hanger.

The purpose of this invention is to reduce as far as possible the number of accidents resulting from welders or operators leaving lighted blow torches.

When a welder is interrupted for a comparatively short period, he prefers not to turn off the blow torch, because once the torch is turned off, it is necessary to readjust the proportionate amounts of oxygen and gas supplied thereto when it is again lighted. To offset this inconvenience, this invention includes valves in the supply connections of the gas and oxygen of a blow torch in addition to the usual adjusting valves in the head of the torch, wherein with the valves positioned in a hanger and adapted to be closed by the weight of a torch on the hanger, the exact proportions of the fluids are maintained, wherein when the torch is again lighted, the adjustment of the individual fluids is not required.

The object of this invention is to provide a safety shut-off hanger for blow torches and the like wherein the supply connections of gas and oxygen of the torch are automatically closed by the weight of a blow torch upon the hanger in which the relative proportions of the gas and oxygen are not disturbed.

Another object is to provide a hanger for blow torches and the like in which the gas and oxygen supply connections pass through the base thereof, and which is provided with means for closing these connections as a torch is placed upon the hanger, which automatically operates to open said connections as the torch is removed from the hanger.

Another object of the invention is to provide a hanger for blow torches and the like which closes the supply of gas and oxygen to the torch as the torch is placed upon the hanger in which valves positioned to close said gas and oxygen connections are operated to opening and closing positions simultaneously.

A further object of the invention is to provide a hanger for blow torches and the like that automatically shuts off the supply of oxygen and gas to the blow torch as the blow torch is placed upon the hanger, and automatically releases the supplies of the oxygen and gas as the blow torch is removed from the hanger, which is of a comparatively simple and economical construction.

With these and other objects in view, the blow torch hanger of this invention includes a valve casing having an interior opening divided by a diaphragm with inlet and supply connections in communication with said opening, plungers positioned to engage the diaphragm to close said supply connections, a hanger arm extending from the casing having a hook adapted to suspend a blow torch, means operatively connecting the arm to the plunger for actuation of the plunger to close the supply connections as a blow torch is placed upon the arm, and resilient means adapted to return the plungers to open said supply connections as the blow torch is removed from the arm.

Other features and advantages of the invention will appear from the following description taken in connection with the drawings, wherein:

Figure 1 is a view showing a side elevation of the hanger with the arm in the extending position.

Figure 2 is a plan view of the hanger.

Figure 3 is a cross-section through the base of the hanger on line 3—3 of Figure 2, showing the supply and discharge connections and arm in elevation, and with the outer end of the arm broken away.

Figure 4 is a view showing an end elevation of the base or valve casing with the arm shown in section.

Referring now to the drawings, wherein like reference characters indicate corresponding parts, the blow torch hanger of this invention includes a base 10 which forms a valve casing, an upper section 11 and an outwardly extending arm 12 on the outer end of which is a hook 13 that may be positioned to receive and hold a blow torch or the like.

The base 10 is formed with openings 14 therein forming gas and oxygen chambers, respectively, and these chambers are individually connected to supply connections or tubes 16 and 17 through elbows 18 and 19, each of which is threaded into a socket 20 in the base and connected to the supply tube with which it is associated by a nipple or coupling 21. Each of the elbows 18 and 19 is provided with an interior opening 22 that registers with an opening 23 extending through a nipple 24 in the base and springs 25 are provided in the openings. The upper ends of the nipples 24 are positioned to be engaged by a diaphragm 26 mounted between the base 10 and the upper section 11, as shown in Figure 3, wherein, when the diaphragm is moved downward to contact the upper end of the nipples, the openings through the nipples are closed. Each of the chambers 14 and 15 is also provided with a side outlet connection 27 with a coupling element 28 therein, and the discharge tubes or connections 29 and 30 extend from these connections.

The upper section 11 is also provided with chambers 31 corresponding with the chambers 14 and 15 in the base, and plungers 32 and 33, each of which has a head 34 at the lower end, are slidably mounted in openings 35 and positioned so that their upper ends will engage the lower surface of a block 36 through which the arm 12 extends. The plungers 32 and 33 and the arm 12 are held in the upper position illustrated in full lines in Figure 3 by the springs 25, as shown. The inner end of the arm 12 is pivotally mounted on a pin 37 extending through a post 38 extending upward from the upper section 11. In the design shown, the post 38 is shown as being attached to the upper section 11 by a screw 39, although it will be understood that the arm may be mounted on the section in any manner. The upper section 11 may be attached to the base 10 by screws 40, as shown in Figures 2 and 3, or by any means.

The blow torch hanger of this invention includes a valve casing with supply connections for gas and oxygen entering the lower surface from respective sources of supply such as conventional tanks or gas cylinders containing respectively oxygen and a combustible gas under pressure, as indicated by the elements 16 and 17, and discharge connections 29 and 30 extending to the blow torch. The valve casing is interposed in the fluid conduits between the gas cylinders and the blow torch and includes valve elements associated with the conduit connections and the valves are positioned to close said connections as they are actuated to the closed position by the weight of a blow torch on the end of the arm 12 that closes the valve elements through the plungers 32 and 33. By this means and with all welders trained to always place a blow torch on the hanger, when not in use, all danger of damage resulting from leaving blow torches lighted may be substantially eliminated.

It will be understood that changes may be made in the design and arrangement of the elements without departing from the spirit of the invention.

What is claimed is:

A device for holding a blow torch and stopping the flow of combustible gas to the same comprising a base block including a substantially flat upper face provided with separate spaced recesses, the base block having inlet and outlet ports leading from the exterior of the base block into each of said separate recesses, an upper block secured to the top of the base block and having a substantially flat bottom face provided with separate spaced recesses which register with the recesses of the base block, a single continuous substantially flat resilient diaphragm mounted between said base and upper blocks and extending entirely across all of said recesses of the base and upper blocks, said diaphragm extending over said inlet ports of the recesses of the base block and being normally spaced from such ports so that the ports remain open, the upper block having a pair of spaced bores extending through its top and leading into the separate recesses of the upper block, separate plunger rods slidably mounted within the bores of the upper block and projecting into the recesses thereof for contact with the top of the resilient diaphragm to urge it downwardly for covering the inlet ports, a connecting head resting on the tops of the plunger rods and disposed above the top of the upper block, a post secured to the upper block adjacent to one side thereof and projecting above the top of the upper block and spaced laterally of the plunger rods and connecting head, and a substantially horizontal elongated hanger arm pivotally connected with the post above the upper block and extending across the upper block and beyond the side of the upper block remote from the post for a substantial distance, the plunger rods and registering recesses of the blocks being arranged upon opposite sides of the hanger arm, the hanger arm being swingable in a substantially vertical plane and connected with said connecting head for shifting the plunger rods downwardly against the diaphragm when the blow torch is placed upon the hanger arm.

RAYMOND F. GERVAIS.

REFERENCES CITED

The following references are of record in the file of this patent:

UNITED STATES PATENTS

| Number | Name | Date |
|---|---|---|
| 1,639,450 | Bastian | Aug. 16, 1927 |
| 2,277,395 | Franck | Mar. 24, 1942 |

FOREIGN PATENTS

| Number | Country | Date |
|---|---|---|
| 445,567 | Great Britain | Apr. 14, 1936 |
| 547,753 | Great Britain | Sept. 9, 1942 |
| 553,224 | Great Britain | May 12, 1943 |